United States Patent [19]

Larsen

[11] 4,045,673

[45] Aug. 30, 1977

[54] TEST CHAMBER FOR ALPHA SPECTROMETRY

[75] Inventor: Robert P. Larsen, Downers Grove, Ill.

[73] Assignee: The United States of America as represented by the United States Energy Research and Development Administration, Washington, D.C.

[21] Appl. No.: 685,589

[22] Filed: May 12, 1976

[51] Int. Cl.[2] .......................... G01T 1/20; G01T 1/24
[52] U.S. Cl. .................................. 250/364; 250/336; 250/370
[58] Field of Search ............... 250/364, 370, 371, 336

[56] References Cited

U.S. PATENT DOCUMENTS

| 3,458,701 | 7/1969 | Schell | 250/364 X |
| 3,988,587 | 10/1976 | Shreve, Jr. et al. | 250/364 |

Primary Examiner—Archie R. Borchelt
Attorney, Agent, or Firm—Dean E. Carlson; Frank H. Jackson; Donald P. Reynolds

[57] ABSTRACT

Alpha emitters for low-level radiochemical analysis by measurement of alpha spectra are positioned precisely with respect to the location of a surface-barrier detector by means of a chamber having a removable threaded planchet holder. A pedestal on the planchet holder holds a specimen in fixed engagement close to the detector. Insertion of the planchet holder establishes an O-ring seal that permits the chamber to be pumped to a desired vacuum. The detector is protected against accidental contact and resulting damage.

5 Claims, 1 Drawing Figure

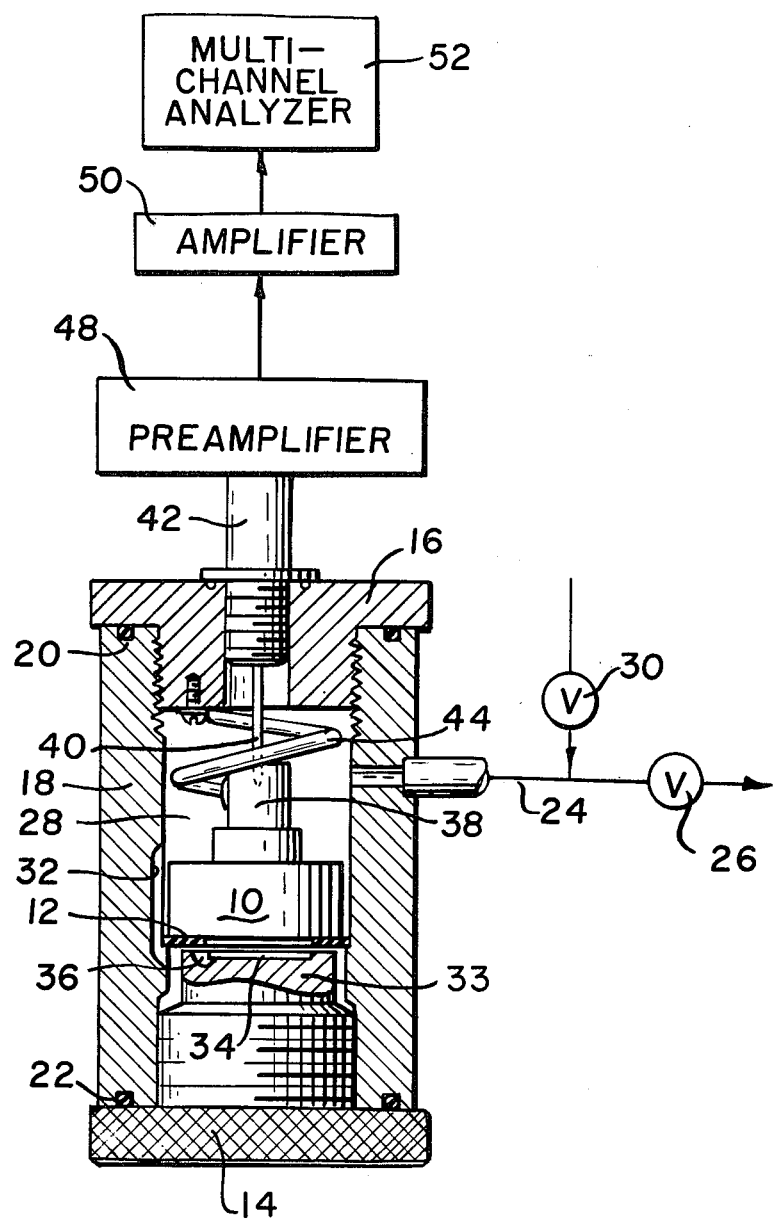

TEST CHAMBER FOR ALPHA SPECTROMETRY

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to an apparatus for measurement of a spectrum of alpha emissions from a radioactive source.

Radiochemical analysis of materials is important to the determination of elements that emit alpha particles, such as plutonium, at environmental levels. For monitoring purposes, it is useful to be able to detect with accuracy the concentrations of both man-made alpha-emitting nuclides and those that occur naturally. Such determinations are commonly made by separating the alpha emitter chemically from the other constituents of a sample and measuring the amount of the alpha emitter by placing it close to a surface-barrier detector, evacuating the region between them, and connecting the surface-barrier detector as a diode in an external circuit that measures current pulses through the detector under suitable conditions of bias. Each such current pulse represents a disintegration producing an alpha particle and the count of such disintegrations over a known period of time provides a measure of the amount of the alpha emitter. Spectral information is also available from the detected pulses. Several manufacturers produce commercial chambers designed to support a surface-barrier detector in a fixed position near a planchet containing radioactive material. Such chambers also provide means for establishing a vacuum sufficient to avoid interference with the count.

All of the test chambers that are commercially available suffer from one or more of the following disadvantages. Some lack protection for the surface-barrier detector. They expose the detecting surface to the possibility of being touched by the alpha emitter, by a support tray or by the finger of an operator. Any such contact with the detector may damage or destroy it. Some suffer from a lack of facility for reproducibly placing the alpha emitter in close proximity to the detector. Some chambers that are commercially available cause delays in beginning measurement by the time taken to pump down a test chamber that has a volume that is large in comparison with the volume of the actual measuring region.

It is an object of the present invention to make a better chamber for measuring alpha radiation from alpha emitters.

It is a further object of the present invention to provide a test chamber for alpha spectrometry that protects a detector from accidental contact.

It is a further object of the present invention to provide a test chamber for alpha spectrometry that has a minimum pumpout volume.

It is a further object of the present invention to increase the reproducibility of positioning of an alpha emitter near a detector.

Other objects will become apparent in the course of a detailed description of the invention.

SUMMARY OF THE INVENTION

A test chamber for measurement of the alpha spectrum of an alpha emitter comprises a surface-barrier detector, means for positive location of the detector within a protective support structure, means for placing a planchet containing an alpha emitter in close repeatable proximity to the detector, means for establishing a vacuum in the test chamber and means for establishing electrical connections between the detector and the outside of the chamber.

BRIEF DESCRIPTION OF THE DRAWING

The drawing is a partial sectional view and electrical block diagram of the test chamber.

DETAILED DESCRIPTION OF THE INVENTION

The drawing shows a partial sectional side view of the test chamber together with an indication by block diagram of the electrical apparatus used to practice the invention. In the figure, detector 10 is a surface-barrier detector of a type commonly used for alpha detection. Such detectors are typically of lithium-drifter silicon and comprise diodes whose conduction properties are affected in a detectable way by the presence of alpha radiation. Detector 10 is placed touching guard ring 12 which, in turn, is in close physical proximity to planchet holder 14. Detector 10 is connected physically to detector support 16. Both planchet holder 14 and detector support 16 are threaded to engage tube 18 and to form therewith a vacuum structure. O-rings 20 and 22 are disposed between detector support 16 and tube 18 and planchet holder 14 and tube 18 respectively to maintain a vacuum seal. Line 24 is connected through valve 26 to a vacuum pump to remove gases and thereby generate the vacuum, typically of the order of 0.001 Torr. Valve 26 can be closed to isolate the chamber 28 from the vacuum pump. Valve 30 is a vent to admit air to chamber 28 when it is desired to change planchets. Pumpout groove 32 is milled or otherwise formed in the inside wall of tube 18 to provide a pumping connection around detector 10.

Alpha emitters are normally plated prior to measurement on a surface of a planchet, typically a circular metallic disk having a nominal diameter of the order of $\frac{3}{4}$ inch (1.9 cm) and a thickness of the order of 20 mils (0.5 mm). Planchet holder 14 has a pedestal 33 containing a recess 34 sized and shaped to hold such a planchet; the height of the pedestal 33 is such that the planchet is reproducibly positioned 0.01 inch (0.25 mm) from the guard ring 12. Recess 34 is circular except for a tweezer groove 36 to facilitate removal of a sample. Counts indicating the emission of alpha rays that are detected in detector 10 are coupled to coaxial connected 38 through elongated center conductor 40 to vacuum feedthrough 42. A ground return from coaxial connector 38 is effected through wire 14 to detector support 16. A signal passes from vacuum feedthrough 42 to preamplifier 48, which may be mounted on vacuum feedthrough 42, thence to amplifier 50 and multichannel analyzer 52 which displays a radiation spectrum.

In a typical chamber constructed for the practice of the present invention, detector 10 was a silicon surface-barrier detector that was supplied commercially with a female BNC connector comprising coaxial connector 38. Detector 10 had a nominal outside diameter of 1$\frac{1}{4}$ inches (3.2 cm). Guard ring 12, planchet holder 14, detector support 16 and tube 18 were all made of 6061-T aluminum, a commercial alloy selected for machinability. The only requirement for the materials of these parts is that they do not contain any naturally occurring nuclide, such as radium or the like, that decays radioactively by alpha emission. In an alternate embodiment, guard ring 12 was made of nylon. Tube 18 was machined to an inside diameter of 1.20 inches (3.05 cm) being the location of guard ring 12 and 1.30 inches (3.30 cm) above the location of guard ring 12, thus providing a shoulder against which guard ring 12 was placed with a press fit. Guard ring 12 was 1/16 inch (1.6 mm) thick and had a hole 47/64 inch (1.86 cm) in diameter. The outer circumferences of both planchet holder 14 and detector support 16 were knurled to facilitate removal. It should normally, however, be necessary to change a detector 10 no more often than every year or two, while planchet holder 14 is likely to be left in place for measuring periods ranging from a few minutes to several days. The measuring periods are determined by the time needed by obtain statistically significant counts. The excellent physical protection afforded to detector 10 by its placement within tube 18 and its near complete enclosure by tube 18, detector support 16 and guard ring 12 minimizes the probability of accidental physical contact with anything with detector 10 and this increases the probability of its functioning for long periods of time.

The elongated center conductor 40 was installed in a standard male BNC vacuum feedthrough connector and maintained frictional contact with coaxial connector 38 that was sufficient to support coaxial connector 38 and detector 10 during insertion into tube 18. Wire 44 provides additional protection against dropping detector 10 upon insertion or removal.

In the practice of this invention, it has been of especial importance to minimize the pickup of electrical noise when measuring samples of plutonium in the extremely low concentrations that are characteristic of atmospheric samples. For this purpose, it is desirable to assure that at least that portion of tube 18 that surrounds detector 10, coaxial connector 38 and centerconductor 40 is made of an electrical conductor to serve in effect as the outer conductor of a coaxial cable. It was also desirable for the same reason to mount the preamplifier 48 directly on vacuum feedthrough 42. A preamplifier 48 appropriate for such mounting and an amplifier 50 connected thereto were supplied as a unit from Instrument Development Products. The output of the amplifier 50 was connected to a multi-channel analyzer 52 that was a Nuclear Data Model 110, a 128-channel analyzer. Spectra obtained therefrom are analyzed by well-known techniques to identify quantities and types of isotopes present in the sample.

The embodiment of the invention in which an exclusive property or privilege is claimed are defined as follows:

1. A test chamber for alpha spectrometry comprising:
   a detector responsive to alpha radiation to generate therefrom an electrical signal;
   means for supporting the detector in a fixed reproducible position;
   means for disposing an alpha emitter an a metal planchet in reproducible close proximity to the detector;
   means for maintaining the alpha emitter and the detector in a vacuum environment; and
   means connected to the detector for coupling the electrical signal outside the vacuum environment.

2. The structure of claim 1 wherein the detector is a surface-barrier detector.

3. The structure of claim 2 wherein the means for supporting the surface-barrier detector comprise:
   a hollow cylindrical tube;
   an annular guard ring disposed within the tube, the guard ring having an outer circumference and an inner circumference, the inner circumference less than the circumference of the alpha emitter and the detector, the outer circumference in physical contact with the tube; and
   a closure in threaded engagement with the tube and forming therewith a vacuum seal, the closure including a coaxial vacuum feed-through connected to and supporting the detector and establishing an electrical coaxial connection to the detector.

4. The structure of claim 3 wherein the means for disposing an alpha emitter comprise a sample holder in threaded engagement with the tube and forming therewith a vacuum seal, the combination of the tube, the closure, and the sample holder forming a vacuum enclosure, the sample holder including a pedestal for supporting a metal planchet an alpha emitter in a reproducible position in measuring proximity to the detector.

5. A structure for measurement of a spectrum of alpha radiation from an alpha emitter disposed on a round test planchet, the structure comprising in combination:
   a hollow tube having an axis, an upper end and a lower end, each of said ends grooved for an O-ring and threaded;
   a guard ring disposed within and connected to the tube, the guard ring perpendicular to the axis and including a passaage through the guard ring along the axis;
   a surface-barrier detector disposed within the hollow tube against the guard ring to shadow the passage through the guard ring and accept alpha radiation therethrough;
   a detector support threaded to engage the hollow tube at the upper end thereof, the detector support including coaxial feedthrough means to establish electrical contact with and support the detector;
   a first O-ring disposed in a groove at the upper end of the tube and forming with the detector support a vacuum seal;
   a sample holder threaded to engage the hollow tube at the lower end thereof, the sample holder including a pedestal sized and shaped to hold a planchet containing an alpha emitter in closer repeatable proximity to the passage through the guard ring and to the surface-barrier detector when the sample holder is screwed into the hollow tube;
   a second O-ring disposed in a groove at the lower end of the tube and forming with the sample holder a vacuum seal; an
   a vacuum line connected through the hollow tube to permit the establishment of a vacuum therein.

* * * * *